United States Patent [19]
Dade et al.

[11] Patent Number: 5,199,912
[45] Date of Patent: Apr. 6, 1993

[54] ELECTRIC POWER SYSTEM FOR MARINE VEHICLES

[75] Inventors: Thomas B. Dade, Poquoson; Kenneth W. Leiding, Norfolk, both of Va.; Peter P. Mongeau, Hopkinton, Mass.

[73] Assignee: Newport News Shipbuilding and Dry Dock Company, Newport News, Va.

[21] Appl. No.: 745,350

[22] Filed: Aug. 15, 1991

[51] Int. Cl.$^5$ .............................................. B63H 21/12
[52] U.S. Cl. ......................................... 440/6; 290/4 R
[58] Field of Search .................. 440/1, 4, 6; 290/1 R, 290/4 R, 45; 322/90; 307/16, 84; 318/140, 148, 588, 589

[56] References Cited

U.S. PATENT DOCUMENTS

| | | | |
|---|---|---|---|
| 2,911,541 | 11/1959 | Neufville | 290/4 R |
| 3,047,724 | 7/1962 | Neufville | 290/4 R |
| 3,411,013 | 11/1968 | Vogelsang | 290/4 R |
| 3,543,518 | 12/1970 | Shibata | 290/4 R |
| 4,114,555 | 9/1978 | O'Brien | 440/6 |
| 4,661,714 | 4/1987 | Satterthwaite | 290/4 R |
| 4,709,203 | 11/1987 | Roux | 290/4 R |

FOREIGN PATENT DOCUMENTS

| | | |
|---|---|---|
| 1756430 | 8/1970 | Fed. Rep. of Germany . |
| 3835418 | 5/1990 | Fed. Rep. of Germany .. |
| 8302099 | 6/1983 | PCT Int'l Appl. . |

Primary Examiner—Joseph F. Peters, Jr.
Assistant Examiner—Clifford T. Bartz
Attorney, Agent, or Firm—Lalos & Keegan

[57] ABSTRACT

An electric power system for large marine vehicles in which one or more AC generators are shared as the ship's propulsion power source and the ship's electrical service power source. The voltage from the AC generator(s) is rectified to a reduced DC voltage such that voltage transients in the propulsor motor do not reflect into the ship service power system. Silicon controlled rectifier (SCR) bridges are utilized to convert the generator's AC voltage into a reduced DC voltage. As a supplement for emergency power, a rechargeable battery is included to provide power for propulsion and ship service.

13 Claims, 4 Drawing Sheets

ELECTRIC POWER SYSTEM FOR MARINE VEHICLES

FIELD OF THE INVENTION

This invention relates generally to electric power systems for marine vehicles and more particularly to power systems for both propulsion and shipboard service in submersible vessels or surface ships.

BACKGROUND OF THE INVENTION

In large marine vehicles, two distinct power requirements exist. One requirement is propulsion (i.e. power to drive the propeller shaft), the other is shipboard electrical service (i.e. lighting, computers, electronics, etc.). Since the power demands for propulsion and shipboard service are so different, separate and distinct power generation systems are generally provided. A typical mechanical propulsion plant would include two propulsion turbines, a reduction gear, two turbine generator sets, and two motor generator sets to supply propulsion and ship service electric power. Due to the large number of rotating machines, these existing systems tend to be noisy, large, heavy, and expensive to build and maintain. Existing electric propulsion systems for ships also tend to be very large and heavy due, in part, to the fact that separate electrical power generation must be provided for propulsion and shipboard service. As an alternative to separate power generators, there has been some suggestion of utilizing the same electrical generators for both propulsion and ship service. U.S. Pat. No. 4,661,714 discloses one such alternative in which the three-phase electrical power which drives the ship's propulsion motors also supplies the main shipboard electrical service through a transformer. A major disadvantage of such system is that propulsion motor voltage transients affect shipboard service, which typically includes electronic equipment that may be damaged or at least disrupted by major power fluctuations.

SUMMARY OF THE INVENTION

It is an object of the present invention to provide an improved electric power system for marine vehicles.

It is another object of the invention to provide an electric power system with a reduced number of rotating machines.

A further object of the invention is to utilize the same electric power generator(s) to supply both electric propulsion power and ship service power.

Another object of the invention is to prevent propulsion motor voltage transients from affecting shipboard service.

It is yet a further object of the invention to provide an uninterruptable power source in the electric power system by means of a rechargeable battery.

The electric power system of the present invention includes, in a preferred embodiment, two high speed generators that supply both propulsion and ship service power. Each of the generators (port and starboard) typically supplies half of the ship's electrical system. However, in case one of the generators fails, electrical switchboards can be set so that the remaining working generator supplies the entire system, at least temporarily.

The electrical output of each generator is converted by propulsion power converters into the appropriate voltage and frequency required by the electric propulsion motor, as is conventional. In the unique system of the present invention, a portion of the generator(s) output is rectified by SCR rectifier bridges for ship service power. The rectified voltage is lower than the propulsion motor voltage so that the ship service power supply can remain constant as long as propulsion motor voltage transients are limited to no more than the reduced voltage.

The SCR rectifier bridges convert the AC generator output power to DC on an intermediate bus. Inverter modules, utilizing insulated gate bipolar transistors (IGBT's), produce high quality AC or DC to meet the ship service load requirements. In a preferred embodiment, a rechargeable battery is connected to the intermediate DC bus to provide uninterruptable power for the ship service. In addition, the battery can be connected to an intermediate bus of the propulsion motor supply system to provide emergency propulsion.

These and other features, objects and advantages of the present invention will be apparent from the foregoing drawings and detailed description. In the drawings, a dot at the intersection of two lines indicates the lines are electrically connected; absence of a dot at the intersection indicates that the lines are not electrically connected.

DETAILED DESCRIPTION

Figure 1:
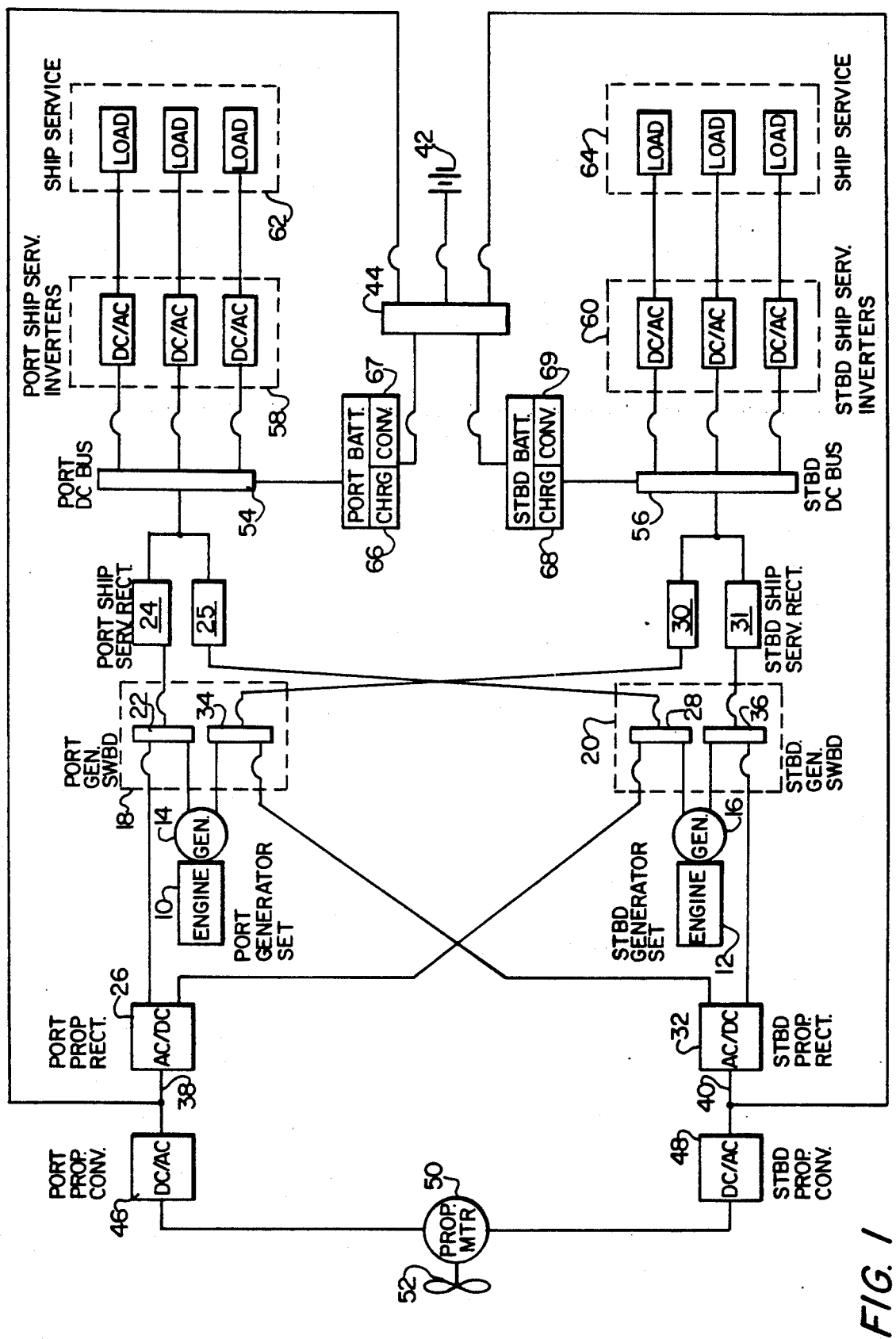
FIG. 1 is a general block diagram of the electric power system of the present invention.

FIG. 1 is a general block diagram of the electric power system of the present invention. The ship's electrical system, in a typical application, is divided into two generally duplicate sides, comprising the port side and the starboard side. The generator sets each comprise an engine 10, 12 and a generator 14, 16. The engines 10 and 12, or more generally the prime mover, may be any suitable power source such as turbine (gas or steam) or diesel. The generators 14 and 16 may be any AC generator suitable for the particular marine vehicle in which the present invention is utilized.

The AC power outputs of the two generators 14 and 16 are connected via appropriate leads to the port generator switchboard 18 and starboard generator switchboard 20, respectively. In normal operation, when both generators 14 and 16 are fully operational, the power output of generator 14 is connected through switchpanel 22 to the port ship service rectifier network 24 and the port propulsion rectifier network 26. Similarly, generator 16 is connected through switchpanel 36 to starboard ship service rectifier network 31 and starboard propulsion rectifier network 32. If either generator output is unavailable, the working generator can automatically supply the other half of the ship through switchpanel 34 or 28 as shown in FIG. 1, and by activating the gate signals to the appropriate ship service and propulsion rectifier networks for the working generator.

Rectifier networks 26 and 32 connect to propulsion DC busses 38 and 40, respectively. These intermediate DC busses also connect to battery 42 through battery switchpanel 44 so that emergency propulsion power can be provided in the case of failure of generators 14 and 16. Busses 38 and 40 are connected to port and starboard propulsion converter networks 46 and 48, respectively, which convert the DC voltage into an operative AC output having a waveform, frequency and magnitude appropriate for the AC propulsion motor 50. Propulsion motor 50, the size and type of which will be selected for a given application, drives propeller 52.

As discussed previously the AC outputs of generators 14 and 16 are connected to the ship service rectifier networks 24, 30 and 25, 31, respectively. Rectifier networks 24, 25 and 30, 31 which will be described in greater detail hereinafter, convert the AC voltage, which on a large ship may be typically 890 VAC, to a reduced DC voltage, which may be typically ±370 VDC (line-to-neutral). The magnitude of propulsion motor voltage transients can be determined empirically for a given marine vehicle or class of vehicles. In accordance with such determination, the voltage supplied by the rectifier networks is maintained constant for ship service at a level reduced from the generator output voltage by a value sufficient to compensate for such transients. The reduced DC voltage from rectifier networks 24, 25 and 30, 31 is fed onto port and starboard DC busses 54 and 56, respectively.

From these intermediate DC busses 54 and 56 the voltage is fed into the ship service power inverters 58 and 60 that provide high quality AC or DC power as required by the ship service loads, which are shown generally as 62 and 64. These loads will typically include lighting, computers, radar and various electronic equipment. In addition, the reduced voltage from busses 54 and 56 is fed into the port and starboard battery charging/converter networks 66, 67 and 68, 69, respectively. These networks 66, 67 and 68, 69 are connected to battery 42 through switchboard 44 to charge the battery during normal operation or to supply DC voltage from the battery to the intermediate DC busses 54 and 56 during emergency situations.

FIG. 1 illustrates the basic electrical system of the present invention. In a typical large marine vehicle separate generator sets are used to provide power for ship service loads. In the unique system of the present invention, power from generators 14 and 16 is shared by propulsion motor 50 and ship service loads 62 and 64, without the danger of propulsion motor transients being reflected into the ship service power system. In addition, battery 42 provides emergency power for both propulsion and vital ship service loads.

Figure 2:
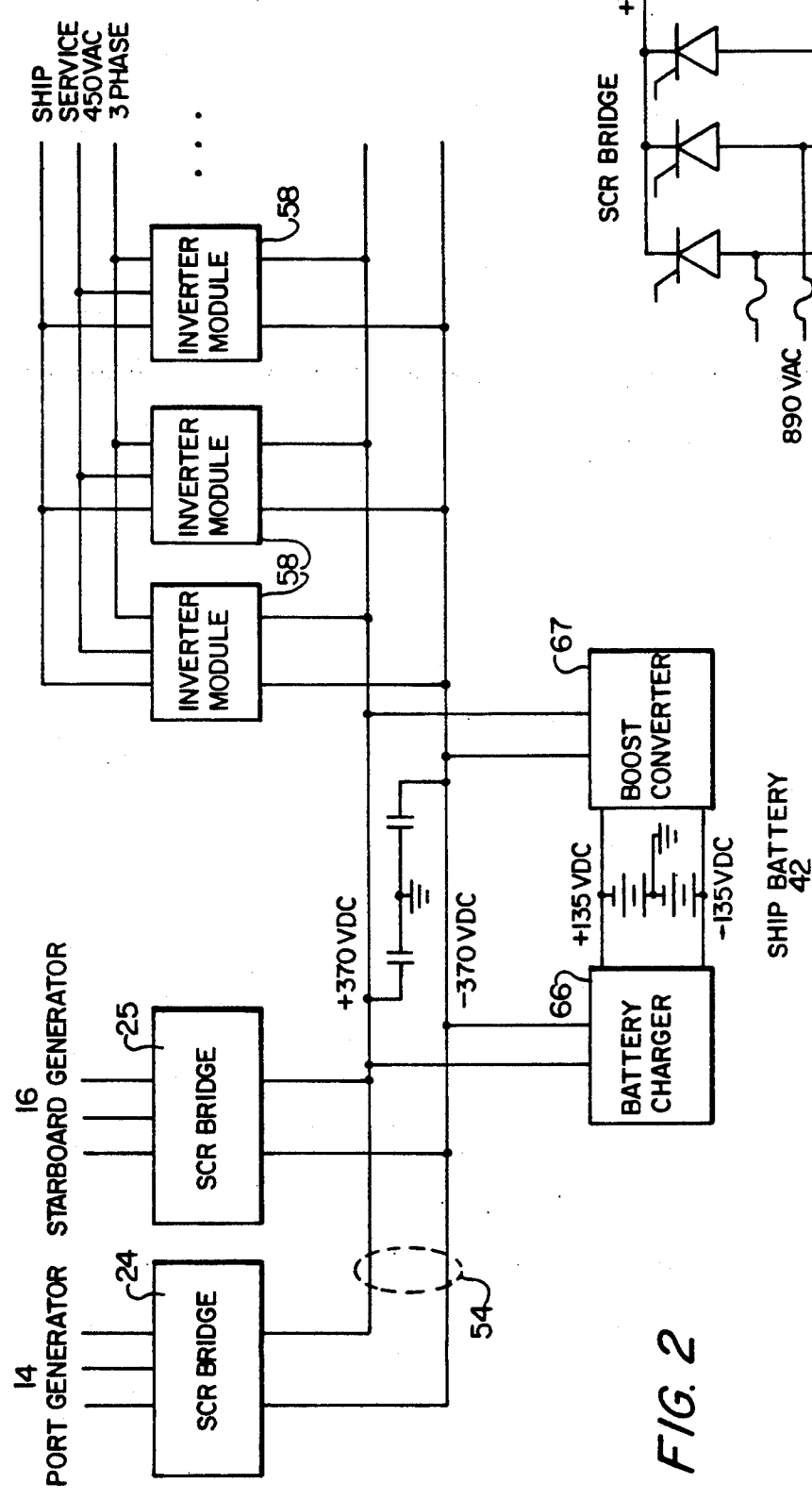
FIG. 2 is a block diagram of the port ship service and battery power systems.
Figure 3:
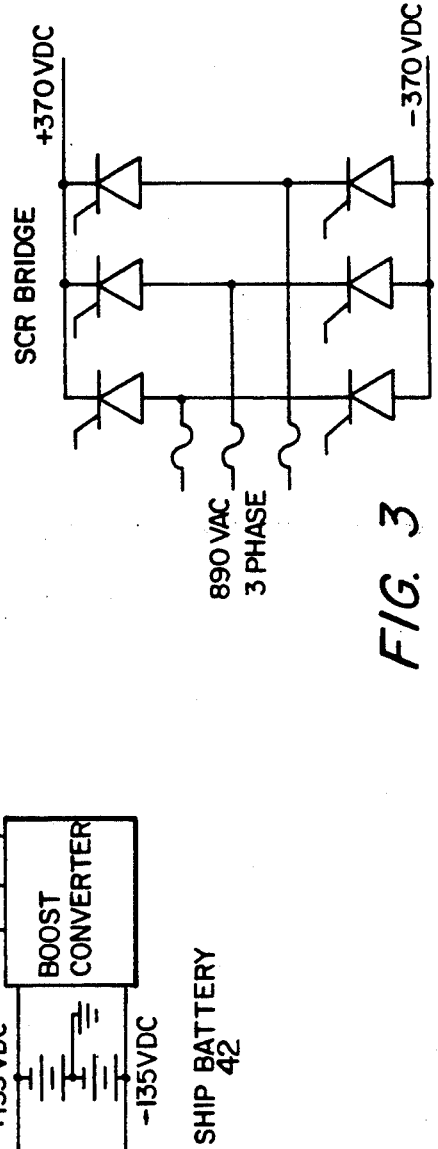
FIG. 3 is a circuit diagram of an SCR bridge utilized for ship service power inversion.

FIG. 2 is a block diagram of the port ship service power and ship battery portion of the electric power system of the present invention. The starboard portion is equivalent. As discussed previously, the AC voltage from the port generator 14 and starboard generator 16 is fed into port ship service rectifier networks 24 and 25, respectively. In a preferred embodiment, shown in FIG. 2, these rectifier networks 24 and 25 comprise silicon controlled rectifier (SCR) bridges. As illustrated in FIG. 3, each SCR bridge is configured as a separate six (6) leg module, one for the port generator input and the other for the starboard generator input. FIG. 3 illustrates one of the 6 leg modules. In a typical large ship system, the AC generator input will be approximately 890 VAC. The SCR bridges rectify this voltage to approximately ±370 VDC (line-to-neutral), which is fed onto the port and starboard intermediate busses 54 and 56. The SCR's are phase controlled, in a conventional manner, to regulate automatically the intermediate DC voltage. By reducing the voltage with the SCR bridges, which automatically compensate for changes in generator voltage, the ship service voltage remains constant even if the generator voltage drops by 40% due to, for example, propulsion motor transients. As mentioned previously, the magnitude of these transients is determined empirically for a particular marine vehicle or class of vehicles.

Figure 4:
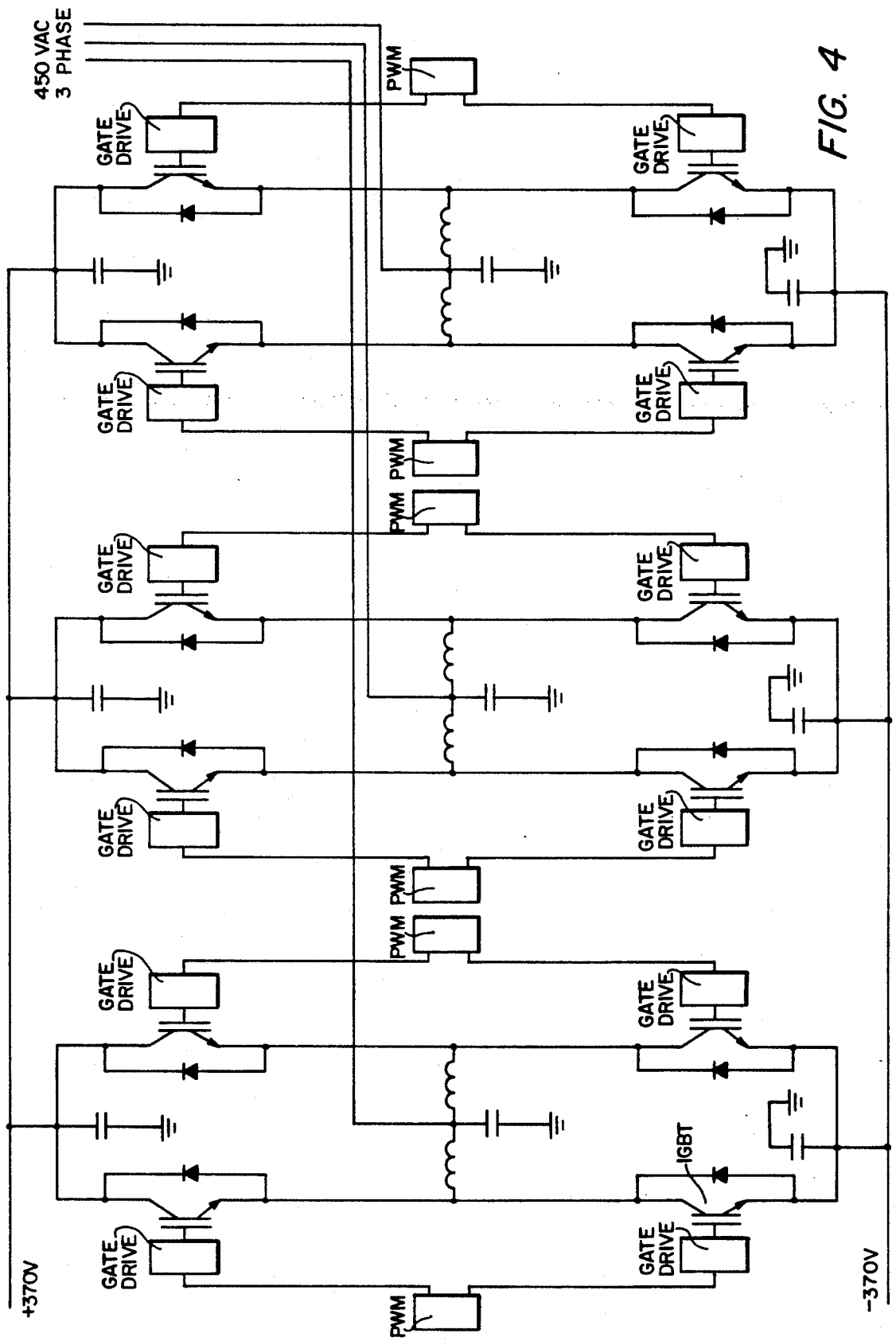
FIG. 4 is a circuit diagram of an inverter module utilized to provide ship service power.

Referring again to FIG. 2, the DC voltage on intermediate bus 54 is fed to the port ship service inverters 58. In a preferred embodiment shown in FIG. 2, the ship service inverters comprise modules separately located within the ship to provide a 450 VAC, three-phase power source. The starboard ship service will have equivalent modules. Alternative DC/AC or DC/DC conversion can be supplied by conventional means to meet particular load requirements. FIG. 4 illustrates a preferred circuit for each port and starboard inverter module. This circuit utilizes insulated gate bipolar transistors (IGBTs) in a pulse width modulation (PWM) mode to convert the DC voltage on the intermediate busses 54, 56 to three-phase AC. Pulse width modulation, which is conventional, can be regulated to control voltage, frequency and phase independently of the load. The PWM frequency is preferably in the range of 20 KHz to minimize ripple and the filter requirements. As shown in FIG. 4, a single stage filter is utilized to reduce the fundamental ripple to less than one percent.

Figure 5:
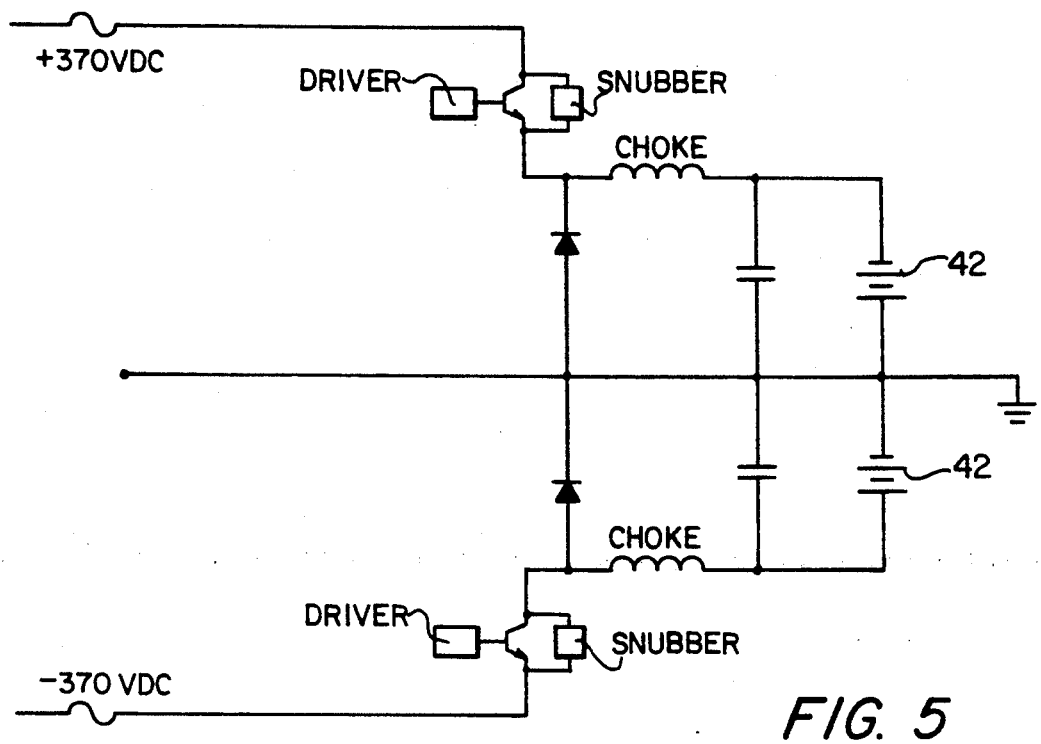
FIG. 5 is a circuit diagram of a battery charger utilized in the power system of the present invention.

Referring to FIG. 2, the DC voltage on intermediate bus 54 is fed into battery charger 66. Separate battery charger circuits (and battery converter circuits) are provided for both the port and starboard halves of the ship in a preferred embodiment, as shown in FIG. 1 (blocks 66, 67 and 68, 69). FIG. 5 illustrates a preferred circuit for the battery charger. This center tap configuration converts the intermediate DC voltage, typically ±370 VDC (line-to-neutral), down to the nominal battery voltage, typically ±135 VDC (line-to-neutral) or 270 VDC (line-to-line). Preferably, IGBTs are used for switching elements and PWM is used to regulate charging power and voltage.

Figure 6:
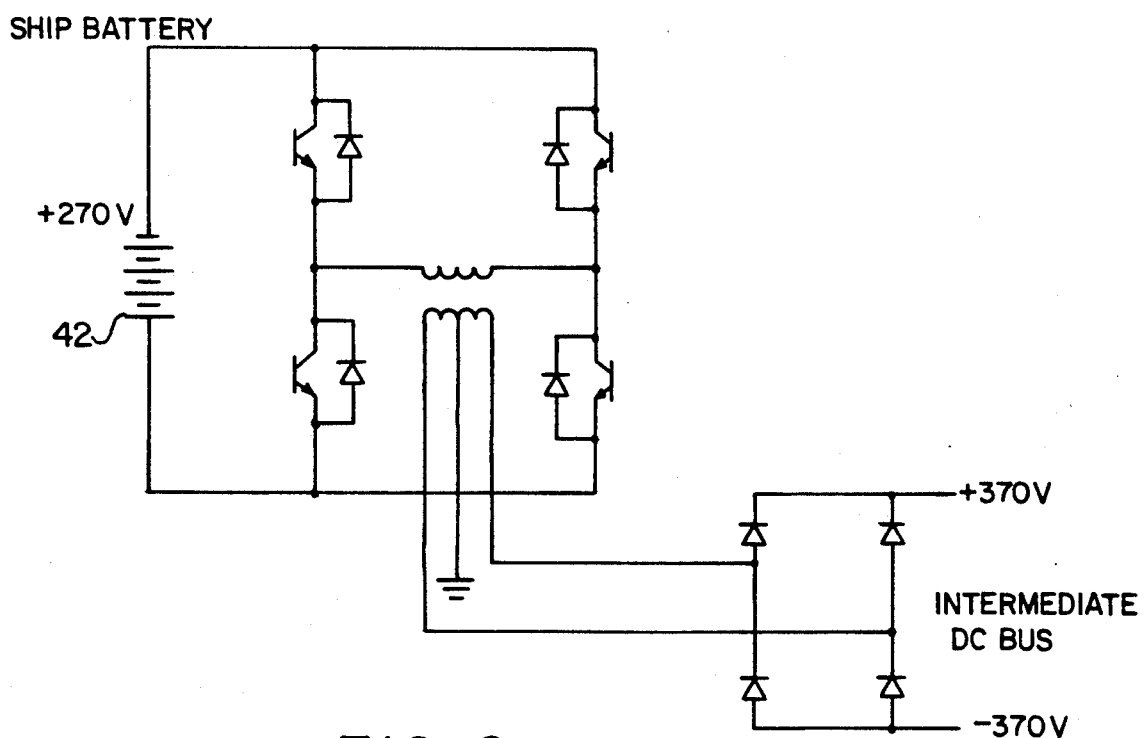
FIG. 6 is a circuit diagram of a battery DC/DC boost converter utilized in the power system of the present invention.

Referring once again to FIG. 2, the ship battery is connected to boost DC-to-DC converter 67. In the case of an emergency, voltage from the ship battery would be applied to intermediate bus 54 to supply the ship service power requirements and also to provide emergency propulsion power, as discussed with reference to FIG. 1. FIG. 6 illustrates a preferred circuit for the boost converter, which utilizes a center tap transformer to step up the battery voltage to the intermediate bus DC voltage. Once again, IGBTs are preferably used for switching elements and PWM is used to regulate power and voltage supplied to the intermediate bus 54. As previously mentioned, although FIG. 2 illustrates only the port ship service, the starboard ship service is equivalent.

The present invention has been described in a preferred embodiment. However, in a smaller marine vehicle separate generator sets (i.e. port and starboard) and redundant circuitry need not necessarily be provided, and in larger marine vehicles various other combinations of more than two generators and one propulsion motor may be provided. Further, alternate circuitry for the inverter modules, battery charger and boost converter will be apparent to those having ordinary skill in the art. As will be apparent from the foregoing, the distinct advantage that the present invention provides is the capability to utilize the same power generator(s) to supply the propulsor power system and the ship service power system without the danger of propulsion motor transients being reflected into and affecting the ship service loads.

We claim:

1. An electric power system for marine vehicles comprising:
    a first generator for generating an AC voltage having a first magnitude;
    a propulsion power system including a propulsion motor for driving a propeller of said vehicle;
    means for coupling said generated AC voltage to said propulsion power system;
    a ship service power system;
    means for coupling said generated AC voltage to said ship service power system including means for rectifying said AC voltage to a controlled reduced magnitude DC voltage, said reduced magnitude DC voltage being less than said first magnitude AC voltage by a given value, whereby voltage transients in said propulsion power system less than said given value are automatically compensated for by said means for rectifying such that they do not affect said ship service power system; and
    wherein said means for coupling said generated AC voltage to said ship service power system includes inverters for converting said reduced magnitude DC voltage into three-phase AC voltage for use by ship service loads and said inverters include insulated gate bipolar transistors (IGBTs).

2. An electric power system according to claim 1 wherein said means for controlled rectification includes a silicon controlled rectifier (SCR) bridge.

3. An electric power system according to claim 1 further including a rechargeable battery.

4. An electric power system according to claim 3 further including a DC bus for carrying said reduced magnitude DC voltage, said DC bus being coupled to said means for controlled rectification and to said inverters.

5. An electric power system according to claim 4 including means for charging said battery, said charging means connected to said DC bus, whereby said battery is charged from said reduced magnitude DC voltage on said DC bus.

6. An electric power system according to claim 5 including converting means connected between said battery and said DC bus for converting battery voltage to said reduced magnitude DC voltage, whereby said battery provides an alternate power supply for said ship service power system.

7. An electric power system according to claim 3 including means for coupling said rechargeable battery to said propulsion power system, whereby said battery provides an alternate power supply for ship propulsion.

8. An electric power system according to claim 1 further including a second generator for generating AC voltage having said first magnitude.

9. An electric power system according to claim 8 including means for coupling AC voltage generated by either said first or second generator to said propulsion motor.

10. An electric power system according to claim 8 including means for coupling AC voltage generated by both said first and second generators to said propulsion motor.

11. An electric power system according to claim 8 including means for coupling AC voltage generated by either or both said first or second generators to a starboard side ship service power system.

12. An electric power system according to claim 8 including means for coupling AC voltage generated from either or both said first or second generators to a port side of said ship service power system.

13. A method of providing electric power for a marine vehicle, said marine vehicle including a propulsion power system and a ship service system, said propulsion power system including a propulsion motor for driving a propeller of said vehicle and said ship service system including electronic equipment that may be damaged or disrupted by voltage transients, said method comprising the steps of:
    generating an AC voltage having a first magnitude;
    coupling said generated AC voltage to said propulsion power system;
    causing propulsion power system voltage transients;
    coupling said generated AC voltage to said ship service power system electronic equipment;
    rectifying said AC voltage to a controlled magnitude DC voltage;
    reducing said DC voltage to a magnitude that is less than said first magnitude AC voltage by a given value;
    compensating for said voltage transients in said propulsion power system that are less than said given value so that said transients do not affect said ship service power system electronic equipment; and
    wherein said step of coupling includes the step of using insulated gate bipolar transistors (IGBTs) to convert said reduced magnitude DC voltage into three-phase AC voltages for use by ship service loads.

* * * * *